April 25, 1961 W. HERMANNS 2,981,567
PULVERULENT DISCHARGE MEANS FOR VESSELS
Filed Dec. 21, 1959 2 Sheets-Sheet 1
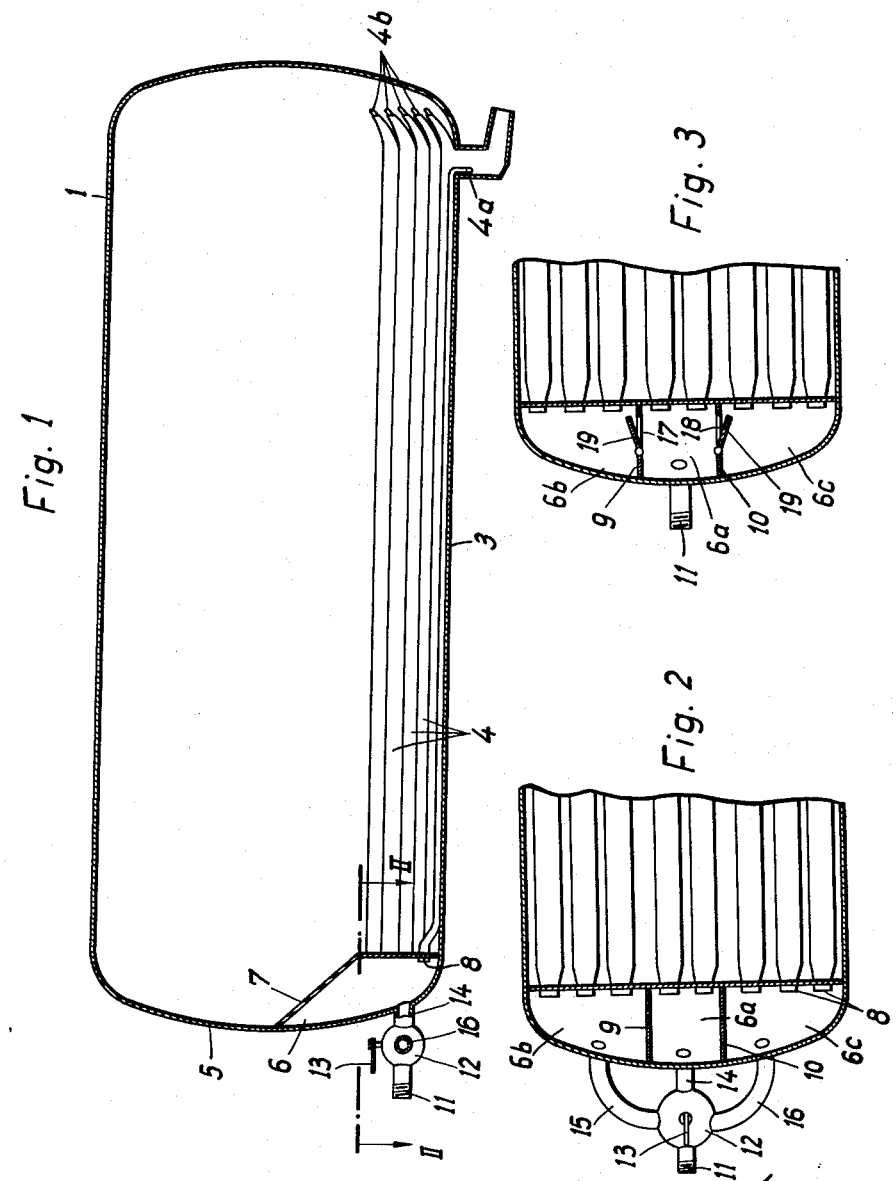

April 25, 1961 W. HERMANNS 2,981,567
PULVERULENT DISCHARGE MEANS FOR VESSELS
Filed Dec. 21, 1959 2 Sheets-Sheet 2
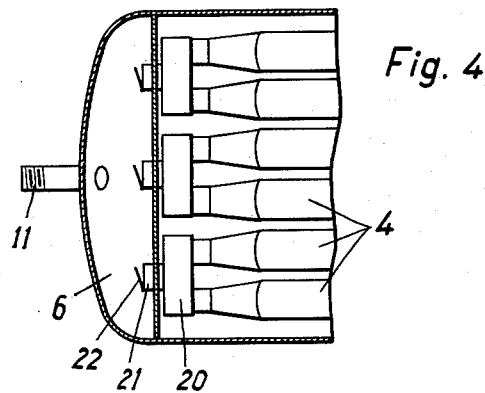
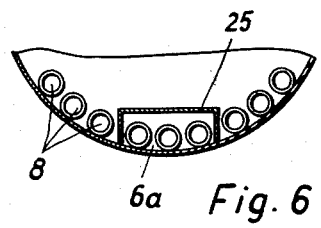
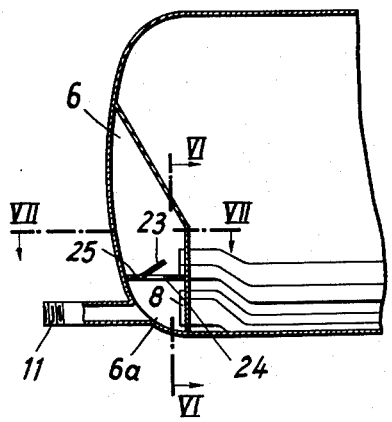
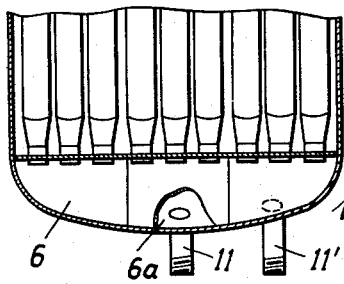
Wilhelm Hermanns
Inventor
by Mason, Porter, Diller + Stewart
attorneys

# United States Patent Office 2,981,567
Patented Apr. 25, 1961

2,981,567

PULVERULENT DISCHARGE MEANS FOR VESSELS

Wilhelm Hermanns, Frankfurter Strasse 6–14, Porz-Urbach, Germany

Filed Dec. 21, 1959, Ser. No. 861,003

Claims priority, application Germany Dec. 27, 1958

3 Claims. (Cl. 302—52)

This invention relates to the emptying of cylindrical long vessels which are filled with material in powder form and along the base of which extend aeration elements, preferably hoses provided with porous walls, which are disposed in parallel relationship to one another and are fed with compressed air, and the invention proposes a method of improving the economy of emptying such long vessels and an emptying device serving for the performance of this method. The object of the invention is, in particular, to render possible complete emptying of long vessels of the said kind with a minimum expenditure of compressed air and hence the use of the smallest possible compressors.

To this end, the invention proposes firstly that the aeration elements, preferably aeration hoses, which extend in parallel relationship to one another along the bottom of the vessel and which extend towards the outlet of said vessel and which are fed with compressed air, should be sub-divided into a middle group extending in the vicinity of the central longitudinal plane of the container and two outer groups disposed laterally thereof; that for the purpose of emptying the container only the middle group of aeration elements should in the first instance be fed with compressed air until the material in powder form situated thereabove flows off; and that the outer groups of aeration elements should then be fed with compressed air until the material in powder form lying on them slides off onto the middle group. Thus if the long vessel is completely filled with material in powder form and only the middle group of aeration elements is fed with compressed air, then in spite of the relatively small quantity of compressed air required to feed only the middle group of aeration elements the greater part of the material in powder form in the vessel already flows off through the outlet aperture; only a part of the material in powder form lying above the lateral groups of aeration elements remains behind in the vessel. If the two lateral groups of aeration elements are subsequently fed with compressed air—additionally or after the shutting off of the supply of air to the group of aeration elements extending along the middle zone of the vessel, the material in powder form lying on said lateral groups of aeration elements flows off laterally to the middle group of aeration elements, since in a cylindrical long vessel the aeration elements situated in its middle zone lie at a lower level than the lateral aeration elements, only a relatively small amount of compressed air being required for this lateral discharge of the material in powder form towards the middle zone, since the amount of material in powder form lying on the lateral groups of aeration elements is small. If, during the feeding of the lateral groups of aeration elements with compressed air, the supply of air to the middle group of aeration elements is blocked, the material aerated in the lateral regions of the container collect in the first instance in the middle zone, whereupon the aeration elements extending in this zone can subsequently again be fed with compressed air in order to discharge the remaining material through the outlet. The supply of air to the aeration elements of the middle zone can, however, also be put into operation again immediately a part of the material in powder form has fallen from the side regions of the vessel onto the aeration elements of the middle zone.

In this way, the compressed air requirements are greatly reduced in comparison with the operation known heretofore, in which all the aeration elements are simultaneously supplied with compressed air, and this is so to such an extent that the compressor installation required can be very much smaller than in the known emptying devices. In this way, both the costs of manufacture of the installation and the operating costs are reduced.

The invention provides various arrangements for combining the aeration elements in groups and to achieve the effect that these groups can be fed with compressed air independently of one another.

According to the invention, the groups of aeration elements may be connected to a common pressure distribution chamber, which is disposed inside the container and which is equipped with individually controllable shut-off means in front of the individual groups of aeration elements. The shut-off means are constructed as valves, slides, flaps or the like in manner known per se. The compressed air introduced into the pressure distribution chamber can, with this arrangement, be distributed in any desired manner to the individual groups of aeration elements.

The lateral groups of aeration elements may, however, be jointly connected to one pressure distribution chamber, and the middle group of aeration elements may be connected to a second pressure distribution chamber which can be fed with compressed air either separately from or simultaneously with the side chamber as required. In this way the constructions of the chambers and the change-over of the air supply are simplified.

Moreover, provision is made for the groups of aeration elements to be connected to three separate pressure distribution chambers, which are disposed inside the container and which can be fed with compressed air either individually or jointly as required, and in fact a pressure distribution chamber sub-divided into three chambers by two partitions is advantageously disposed at the end of the container for the material remote from the outlet, and is divided off by a partition carrying the connections to the aeration elements, for example hose connections, which partition has, in its part situated above the aeration elements, at least an inclination corresponding to the angle of friction of the material in powder form. This construction offers the possibility of obtaining perfect emptying of the end of the container remote from the outlet, without special expenditure. At this point there is generally a dead angle in which material in powder form accumulates, and cannot be engaged and discharged by the air emerging from the aeration elements. The material in powder form which has accumulated above the partition dividing the pressure distribution chambers from the interior of the container slides off towards the aeration elements on the said partition which, according to the invention, is of inclined construction.

According to the invention, various solutions are also provided for the changing over of the compressed air supply for the different pressure distribution chambers.

Each of the pressure distribution chambers provided for the feeding of the various groups of aeration elements may be provided with its own air supply and the air supply of all the pressure distribution chambers may be connected to a change-over means by way of which the chambers can be selectively connected to a source of compressed air either separately or jointly.

According to another embodiment of the invention, only the middle pressure distribution chamber is connected to the source of compressed air. Overflow apertures are provided in the walls of these pressure distribution chambers, and through these apertures the adjoining chambers are fed with compressed air and the said apertures can be closed by means of individually controllable shutoff means.

Some exemplified embodiments of emptying devices according to the invention are illustrated in a simplified form in the drawings, in which:

Figure 1 is a longitudinal section through a container for material in powder form, with an emptying device, the aeration hoses of which are fed with compressed air from three pressure distribution chambers with a preceding change-over means;

Figure 2 is a partial section through the container for the material in powder form, on the line II—II in Figure 1;

Figure 3 is a partial section, similar to Figure 2, through an emptying device fed with compressed air from three pressure distribution chambers which are adapted to be connected to one another;

Figure 4 is a partial section, similar to Figure 2, through an emptying device having one pressure distribution chamber;

Figure 5 is a longitudinal section through the end of a container for material in powder form, with an emptying device fed from two pressure distribution chambers;

Figure 6 is a partial section on the line VI—VI in Figure 5;

Figure 7 is a partial section on the line VII—VII in Figure 5.

In Figure 1, the container 1 for the material in powder form is provided with an outlet 2 at one end. Aeration hoses 4 with porous walls, through which compressed air is blown into the material in powder form, so that the latter flows off through the outlet 2 even when the container 1 is inclined by only a few degrees, extend along the base 3 of the container 1. The compressed air supply to the aeration hoses 4 is situated at the end of the container 1 remote from the outlet 2. From there the air flows through the hoses 4 covering the base 3 of the container 1. The ends 4a of the middle hoses are taken as far as the outlet 2, where they are fastened on the wall of the outlet connection. The adjacent hose ends are taken past the outlet 2 as far as the end wall which closes the container 1 at the outlet end.

At the end wall 5 of the container 1 remote from the outlet 2, a pressure distribution chamber 6 is sub-divided into three chambers 6a, 6b, 6c. This pressure distribution chamber 6 is formed by the partition 7, the upper part of which has an inclination corresponding at least to the angle of repose of the material in powder form, so that the powder slides over this part of the partition 7.

Above the container base 3, sleeves 8 are welded into the partition 7, and through these sleeves are inserted the ends of the aeration hoses 4, where they are fastened with clips or the like.

As shown in Figure 2, partitions 9 and 10 are provided to sub-divide the pressure distribution chamber 6 into the three chambers 6a, 6b and 6c. Connected to the middle chamber 6a are two aeration hoses, which are laid in the centre of the base and the ends 4a of which are taken directly to the outlet 2. The laterally adjacent hoses are connected to the side chambers 6b and 6c.

The supply of compressed air to the emptying device is effected by a compressor plant (not shown) by way of a connection 11 and a change-over three way valve 12. The latter is provided with a handle 13 and is so constructed that either the middle chamber 6a alone is fed with compressed air through the line 14, so that air emerges only from the walls of the middle hoses and discharges the material in powder form situated above these, or the side chambers 6b and 6c are connected to the compressed air supply by way of the lines 15 and 16 while the middle chamber 6a is not so connected, so that the material in powder form situated at the sides of the container is aerated and fed to the hoses in the middle of the container whence, accelerated by the escape of air from the middle hoses after a fresh change-over, it flows off to the outlet 2.

Besides the two control positions of the change-over means 12, in which either the line 14, the lines 15 and 16 are connected to the compressed air supply, a third control position of the change-over valve 12 may be provided, in which, as in installations used heretofore, all the hoses are simultaneously supplied with compressed air. This control position of the change-over valve 12 may be advantageous in order to free the hoses of adhering powder residues after the emptying of the container by a short-duration simultaneous escape of air from all the aeration hoses, this at the same time preventing these powder residues from becoming re-deposited on those hoses through which no air is flowing. If a particularly rapid emptying of the container is desired, this third control position of the change-over valve 12 enables the middle chamber 6a to be fed with compressed air during the entire period of emptying, that is to say even while the side chamber 6b and 6c are connected to the compressed air supply for the purpose of aerating the material in powder form situated above the side hoses, so that the material flowing to the middle hoses from there is discharged at an accelerated rate by the air emerging in addition at that point.

In Figure 3, three pressure distribution chambers 6a, 6b, 6c are again provided for feeding the individual groups of hoses with compressed air, but in this case the middle chamber 6a is connected to the compressor installation directly by way of the connection 11. Thus in this case, the middle group of hoses is fed with compressed air during the entire period of emptying of the container. For the purpose of supplying the side chambers **6*b* and 6*c* with compressed air, overflow apertures 17 and 18 are provided in the partitions 9 and 10. The overflow apertures 17 and 18 can be shut off. In the drawing, the shut-off means 19 are indicated in a simplified form by means of flaps. All types of shut-off means known per se may be used instead, such as valves, slides, and so on. The control of the shut-off means 19** is advantageously effected separately from outside for each individual shut-off means. In this way the lateral groups of hoses may be fed with compressed air independently of one another if material in powder form has clogged on one side while the other has already been emptied.

The sub-division of the pressure distribution chambers may be developed in a similar manner to that shown in Figures 1 to 3, so that a plurality of lateral hose groups are formed, which can be fed with compressed air successively from the centre of the container base towards the sides. The middle group of hoses may, if desired, also be sub-divided.

In Figure 4, the aeration hoses 4 of the emptying device are fed with compressed air by way of a single pressure distribution chamber 6. The hoses 4 are connected in groups to the pressure distribution chamber 6 by way of lengths of tubing 20. The air inlet apertures 21 of the groups of hoses are adapted to be closed by individually controllable shut-off means 22.

In Figures 5 to 7, a middle chamber **6*a* is divided off inside a pressure distribution chamber 6 which supplies compressed air to all the lateral aeration hoses jointly, and the hoses extending in the middle zone of the container are connected to said middle chamber 6*a*. In the construction according to Figure 5, only the middle chamber 6*a* is connected to the source of compressed air by way of the connection 11. The feeding of the pressure distribution chamber 6 and hence the side hoses with compressed air is effected by way of an overflow aperture 24, which is adapted to be closed by a shut-off means 23 and which is disposed in the partition 25** dividing off the middle chamber. With this arrangement, air constantly emerges likewise from the middle hoses during the emptying operation, and on the other hand the hoses extending laterally are capable of being fed only for a short duration until the material which has clogged at the sides is sufficiently aerated and has flowed to the middle hoses, so that from there it can pass to the outlet.

In Figure 7, the construction of the pressure distribution chambers corresponds to Figures 5 and 6. However, connections 11 and 11' are provided separately for the two chambers, so that in this case, in order to obtain a particularly economic compressed air consumption, the supply of air to the middle chamber 6a can be shut off for the period during which the lateral aeration hoses are fed with compressed air.

I claim:

1. Means for discharging pulverulent material from a vessel having a discharge passageway at one end and a distribution chamber having a plurality of compartments across the opposite end, comprising a plurality of air-permeable tubes disposed longitudinally on the bottom of the vessel and connected to one of the compartments, a plurality of air-permeable tubes disposed longitudinally of the sides of the vessel and connected to another of said compartments, and a valve for applying compressed air to said compartments selectively to supply separately the tubes on the bottom of the vessel and to the tubes on the sides of the vessel.

2. Means for discharging pulverulent material from a vessel having a discharge passageway at one end and a distribution chamber having a plurality of compartments across the opposite end separated by partitions, comprising a plurality of air-permeable tubes disposed longitudinally on the bottom of the vessel and connected to one compartment and a plurality of air-permeable tubes disposed longitudinally on each side of the vessel and connected to other individual compartments, an inlet to said first named compartment for compressed air and valve means from said first named compartment to each of said other individual compartments.

3. Means for discharging pulverulent material from a vessel having a discharge passageway at one end and a distribution chamber having a plurality of compartments across the opposite end separated by partitions, comprising a plurality of air-permeable tubes disposed longitudinally on the bottom of the vessel and connected to one compartment and a plurality of air-permeable tubes disposed longitudinally on each side of the vessel and connected to other individual compartments, a supply tube for compressed air and valve means therein for selective connection to one or more of said other compartments.

References Cited in the file of this patent

UNITED STATES PATENTS

| | | |
|---|---|---|
| 2,708,602 | Galle | May 17, 1955 |
| 2,805,896 | Yellott | Sept. 10, 1957 |

FOREIGN PATENTS

| | | |
|---|---|---|
| 738,026 | Great Britain | Oct. 5, 1955 |